May 30, 1961  O. S. TUTTLE  2,986,245
PANEL CONSTRUCTION JOINT
Filed May 19, 1958   2 Sheets-Sheet 1
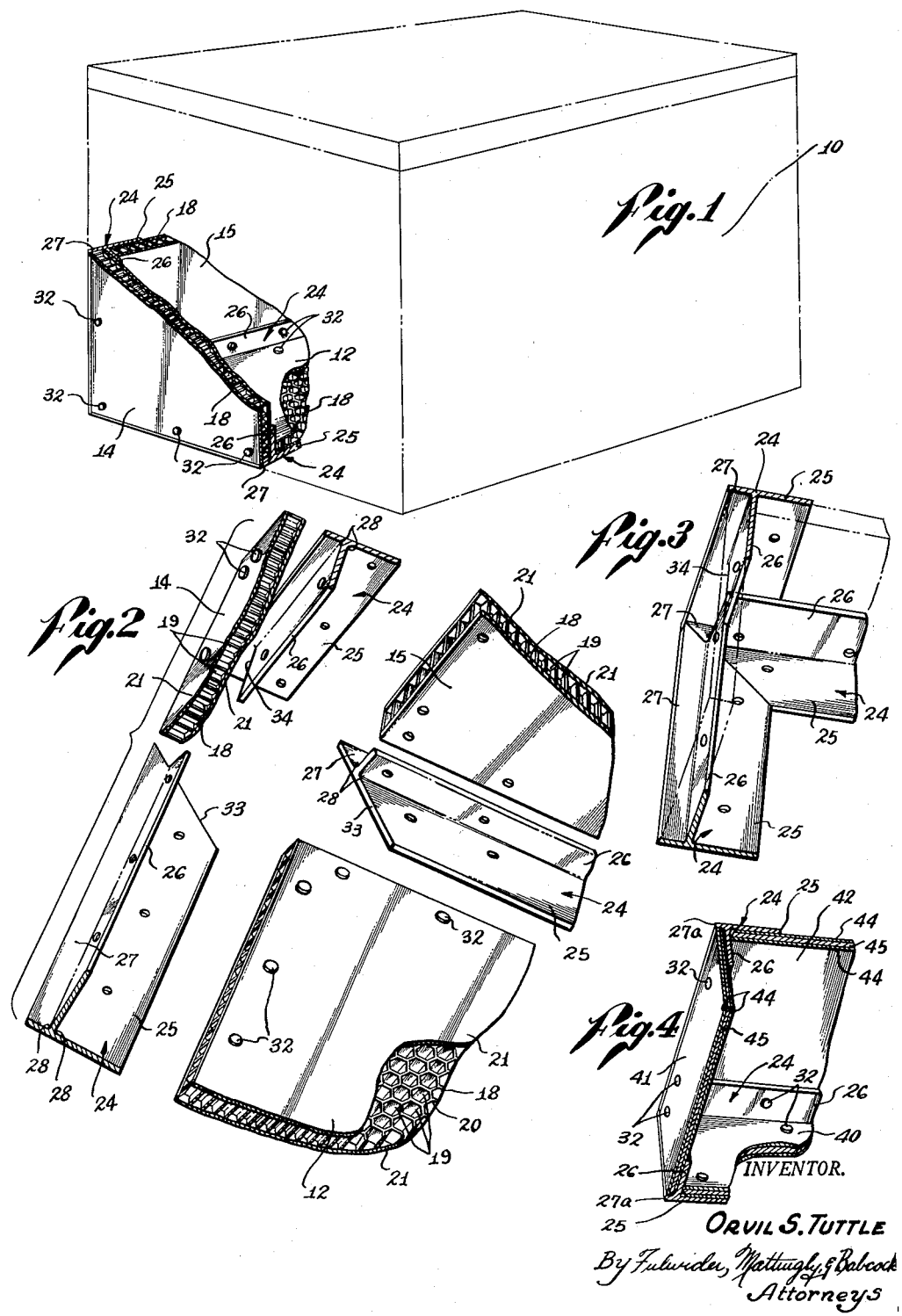
INVENTOR.
ORVIL S. TUTTLE
By Fulwider, Mattingly & Babcock
Attorneys May 30, 1961 O. S. TUTTLE 2,986,245
PANEL CONSTRUCTION JOINT
Filed May 19, 1958 2 Sheets-Sheet 2
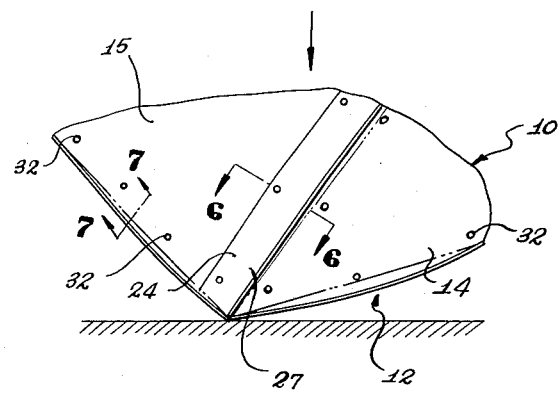
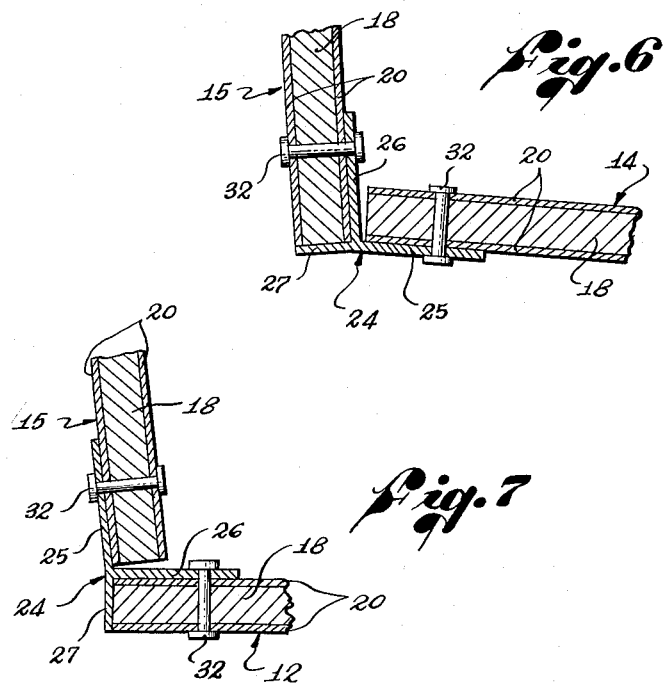
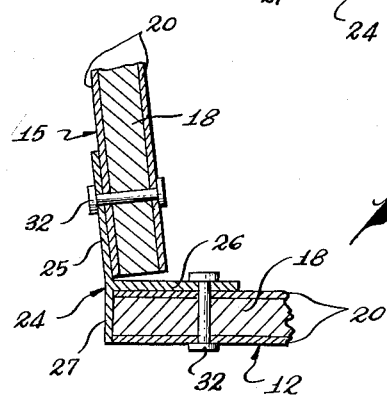
INVENTOR.
ORVIL S. TUTTLE United States Patent Office 2,986,245
Patented May 30, 1961

2,986,245

PANEL CONSTRUCTION JOINT

Orvil S. Tuttle, 781 Amalfi Drive, Pacific Palisades, Calif.

Filed May 19, 1958, Ser. No. 736,077

4 Claims. (Cl. 189—36)

This invention relates generally to panel constructions, and more particularly to an improved joint and corner construction for use in boxes, shelters, and the like where intersecting panels are joined together.

This application is a continuation-in-part of my copending application, Serial No. 328,163, filed December 27, 1952, and entitled "Panel Construction," now abandoned.

A type of structural panels has now been developed which gives excellent strength versus weight characteristics. These panels are laminated and have two relatively thin, high-strength skins or faces bonded on opposite sides of a relatively thick, low-density core. Panels of this type may employ either a core of solid material or a cellular honeycomb type core. In any event, the edges of the panels are generally unfinished, thereby exposing the inner core.

Since the inner core, and also the edges of the thin faces, are exposed at the edges of the panels, and are therefore vulnerable to damage, it is highly desirable that these panel edges be protected when the panels are assembled. This is particularly important where the panels are assembled to form joints and corners, because of the increased likelihood of damage at such points. In addition to providing protection for the edges of the panels, it is also desirable in many applications to assemble the panels in such a manner that joints and corners they form are moisture-tight and seal the exposed panel edges to prevent moisture from entering the core. Furthermore, the joint and corner construction used, in addition to protecting the edges of the panels, should be capable of fully utilizing the high-strength characteristics of the panels, otherwise the use of such panels is futile.

With the foregoing in mind, it is a major object of this invention to provide an improved joint and corner construction for the assembly of structural panels which utilizes, as fully as possible, the high-strength characteristics of the panels.

It is also an important object of this invention to provide a frame member for joining intersecting structural panels which cooperate with the joined panels to protect the exposed edges from damage and form a moisture-tight seal both between the panels and across their edges.

Another object of this invention is to provide a frame member that has a plurality of flanges, the planes of which intersect in such a manner that when used to form a joint between two panels, one flange overlies a surface of one panel, a second flange overlies a surface of the other panel and flanges cover the edges of both panels.

A further object of this invention is to provide a frame member of the type described which may be economically fabricated as an extruded T section and easily adapted so that the three frame members, all of the same T section, may be used to join three intersecting panels into a self-protected corner.

These and other objects and advantages of my invention will become apparent from the following detailed description of a preferred embodiment thereof and from an inspection of the accompanying drawings, in which:

Figure 1 is a perspective view of the joint and corner construction of a box embodying my invention, partially broken away;

Figure 2 is an exploded view of the joint and corner construction shown in Figure 1;

Figure 3 is a perspective view of the corner structure formed by the frame members to join three intersecting panels;

Figure 4 is a perspective view of the joint and corner construction similar to Figure 1, but utilizing a different form of panel;

Figure 5 is a perspective view of the joint and corner construction of Figure 1 showing a corner of the construction under impact;

Figure 6 is a sectional view taken on line 6—6 in Figure 5; and

Figure 7 is a sectional view taken on line 7—7 in Figure 5.

Referring now to the drawings, and particularly to Figure 1 thereof, the numeral 10 designates generally a rectangular box-like structure shown in phantom outline. The box 10 is formed with a horizontal base or bottom panel 12 shown broken away in the center thereof. Base panel 12 is joined to the side and end panels 14 and 15, respectively, which lie in vertical planes that are mutually perpendicular and intersect the plane of the base panel at right angles. The particular shape of the box 10 forms no part of my invention and is merely illustrative of the principles employed.

All of the panels 12, 14 and 15 are of laminated construction, and, in the preferred embodiment, have a cellular honeycomb type core 18. The core comprises a plurality of hexagonal-shaped cells 19 formed by walls 20 made of thin sheeting material. This sheeting material may be an impregnated paper, aluminum foil, or certain other materials of like characteristics. By selecting the material and varying the cell size, the core 18 may be designed for any desired conditions. To each side of the core 18 a thin, relatively dense, high-strength face 21 is adhered by means of a suitable bond, such as solder or glue. The faces 21 carry the load in plane of the panel, while the core 18 carries shear stresses and resists compression loads normal to the plane of the panel.

Because of the vulnerability to damage of the panel edges where the core 18 and the ends of the end faces 21 are exposed, it is highly desirable that these panel edges be protected. It is also desirable to seal the panel edges so that moisture does not collect in the cells of the core 18, and to assemble the panels together in such a manner as to provide a moisture-tight joint.

Another important consideration in assembling the panels is to form the junctions in such a manner that the high-strength characteristics of the panels can be fully utilized in resisting the impacts to which the formed structure is subjected. To this end, I provide frame members 24 which are adapted to bond together the side and end panels 14 and 15 along their line of intersection, and also to bond these panels to the base panel 12. These frame members 24 meet and join each other at the corner junction where the structural panels intersect. As is best seen in Figure 2, each of the frame members 24 is of similar cross-section, having two main intersecting legs 25 and 26 which are joined integrally to form a right-angular channel. In the case of the members 24 joining base panel 12 to side and end panels 14 and 15, the leg 25 lies horizontally beneath the base panel, while the leg 26 extends vertically and lies inwardly of the side and end panels.

Extended outwardly in an opposite direction to leg 25 is a short flange 27 which is formed integrally with the legs and is of a length equal to the edge thickness of the panels. The complete member 24 is thus of generally T-shape with the leg 26 offset and meeting the short flange 27 and leg 25 which form the crossarms of the T. The flange 27 and the legs 25 and 26 therefore intersect along a common axis and to the extent that they are pivotal relative to each other about this axis, the frame member 24 simulates a three flanged hinge.

To reinforce the juncture of leg 26 with leg 25 and flange 27, the corners thereof are provided with small radius fillets indicated at 28. As can be appreciated, the member 24 can be conveniently formed as an extrusion of aluminum or other light-weight metal which is then cut to the proper length for assembly in a particular structure.

As mentioned, the joints between the side and end panels 14 and 15 and base panel 12 are formed by disposing frame members 24 between the panels so that the side and end panels 14 and 15 lie outside of the vertical legs 26 while the base panel lies above and inside of the leg 25. The legs 25 and 26 therefore each lie flush against one face of the panels and are secured thereto by a plurality of spaced fastening means, such as rivets 32. Since the base panel 12 lies above the leg 25, the edge surface of this panel abuts against the leg 26 and is covered thereby to protect and seal the inner core 18. The flange 27 which projects outwardly from leg 25 similarly protects and seals the exposed edge of the side and end panels 14 and 15 and reinforces the same. In order for any leakage to occur between the joined panels, the water must travel along the surface of both the leg and flange so that a box having this construction is well sealed and may even be submerged for a short time without leaking.

Also, since the legs 25 and 26 and the flange 27 of each of the frame members 24 are connected to a common axis about which they can be pivoted hinge-like relative to one another without excessive resistance, as explained above, when the angle between any two joined panels such as side panel 14 and base panel 12 changes due to deformation of the panels under stress, the angle between legs 25 and 26 connected to these panels will also change without offering any substantial resistance. (See Figures 5, 6 and 7.) This prevents a concentration of stress in the fastening means 32, for if the legs 25 and 26 offered excessive resistance to the deformation of the panels 12 and 14, the panels would tend to separate from the legs and the fastening means would have to absorb the stress thus created. In such an arrangement, the structure would be only as strong as the fastening means and the high strength of the panels could not be effectively utilized because the fastening means would undoubtedly fail before the panels were deformed to the point of their maximum stress absorbing ability. The simulated hinge action of the frame member 24 prevents this limitation, however, since the stress on the fastening means, which equals the force necessary to change the angle between legs 25 and 26 to conform with the angle between deformed panels 12 and 14, is relatively small.

If, after the legs 25 and 26 and the flange 27 of the frame member 24 have adjusted to a certain deformation of the panels 12 and 14, an additional stress is applied to the structure causing the panels to deform even more in order to absorb it, the frame member will be further adjusted through the fastening means without applying excessive resistance thereto. Therefore, the high strength of the panels is fully utilized in absorbing stresses applied to the formed structure, and the strength of the structure is not limited by the strength of the fastening means.

From the above discussion of the functioning of my frame members 24, it will be appreciated that the legs 25 and 26 and flange 27 could be joined in other configurations than that of an off-center T where all meet in a common axis. The legs 25 could, for instance, be joined to the leg 26 nearer the fastening means 32 (see Figure 6) providing an off-set between leg 25 and flange 27. In this arrangement, the legs and flange of the frame member would still offer a minimum of resistance to angular displacement between the panels, since they are each free to move relative to each other about a common junction. The off-center T configuration frame member has been found to be quite satisfactory, however, and provides a neat, well protected corner with a minimum number of legs and flanges.

At the corner wherein the two horizontal frame members 24 intersect, each is provided with a beveled end 33 of forty-five degree angle so as to abut each other in a right-angular joint. The vertical frame member 24 lies externally of the end panel 15 and internally of the side panel 14 with the legs 25 and 26 abutting respectively thereon. As will be noted, the flange 27 projects outwardly over the vertical edge of panel 14 to seal and protect it, and the vertical edge of panel 15 is sealed and protected by the leg 26. The vertical frame member 24 is secured to the panels 14 and 15 by spaced rivets 32 in the same manner as the horizontal frame members. At the intersection of the vertical frame 24 with the horizontal frames, the inwardly-disposed leg 26 of the vertical frame is cut back from the end at 34 so as to seal along the top edge of side frame 24, as is best seen in Figure 3. The outwardly-disposed vertical leg 25 and the flange 27 are continued downwardly to the plane of the horizontal frames 24. This provides a corner point which is bounded by frame members and is therefore heavily reinforced to prevent wear and impact damage.

I therefore provide a corner construction which, like my joint construction, seals and protects all the edges of the joined panels and can be simply and compactly formed from a single framing element. Also, my corner construction, since it is formed with the same frame members as my joint construction will permit deformation of the connected panels relative to each other without overstressing the fastening means 32.

In Figure 4, I have shown a modified form of the invention which is generally similar to the preferred form, but makes use of a different structural panel. A bottom panel 40 and side and end panels 41 and 42 are all of similar construction. Each panel comprises a pair of thin high-strength faces 44 bonded to a central core 45 of solid material. This core 45 may be of wood or other relatively stiff material, and is somewhat thinner than the core of the preferred device.

The frame members 24 are again used to form my joint and corner construction and connect the side and end panels 41 and 42 to each other and to the bottom panel 40. Two horizontal frame members 24 meet in a corner junction, as has been previously described, and are joined by a vertical frame member extending along the edges of the side and end panels 41 and 42. As in the previous form of the device, horizontal frame legs 25 extend outside of bottom panel 40, while legs 26 are inside of the side and end panels 41 and 42 and overlie the edges of bottom panel 40 to seal and protect them. The vertical frame leg 25 lies outside of the end panel 42 and the leg 26 lies inside of the side panel 41 and overlies the vertical edge of end panel 42 to seal and protect it. The panels 40, 41 and 42 are connected to their respective frame members by a plurality of spaced rivets 32 in the same manner as in the form of my invention previously described.

To protect the remaining exposed edge surfaces of the panels, each frame member has a flange 27a extending outwardly in an opposite direction to the leg 25. Because of the reduced thickness of the panels, the flanges 27a are shorter than the flanges 27 but are sufficiently long to effectively protect and seal the remaining panel edges. The flanges 27a on the horizontal members protect the horizontal exposed edge of side and end panels 41 and 42, while the similar flange on the vertical frame members protects the exposed vertical edge of the side panel.

While I have shown and described preferred and modified forms of my invention which are fully capable of carrying out the objects of the invention, it can be understood that various changes of design and construction will be apparent to those skilled in the art. Therefore, I do not wish to be restricted to the details herein described, except as defined in the appended claims.

I claim:

1. In a panel structure a joint construction consisting of a first surfacing panel; a second surfacing panel intersecting said first surfacing panel; and a connecting frame member having a first leg connected to said first surfacing panel, another leg joined to said first leg and angularly disposed with respect thereto, which abuts the end of said first surfacing panel and is connected to said second surfacing panel, and a flange, joined to one of said legs, which abuts the edge of said second surfacing panel, said frame member being inherently flexible to form a simulated hinge at the joinder between said first and second legs for relative angular displacement between said legs upon displacement of the relative angular relationship between said panels as a result of external stresses.

2. In a panel structure a joint construction consisting of: a first surfacing panel; a second surfacing panel intersecting said first surfacing panel at a predetermined angle; a frame member having legs normally disposed at said predetermined angle with respect to each other and adapted to receive fastening means, one of said legs being disposed in overlying relationship with the side of said first surfacing panel disposed outwardly with respect to said angle and the other of said legs being disposed to abut the end of said first surfacing panel at the apex of said angle and overlie the side of said second surfacing panel directed inwardly with respect to said angle, and a flange having a length substantially equal to the width of the edges of said panels which abuts the edge of said second surfacing panel adjacent the apex of said angle, said legs and flange all being joined together in said frame member along a common axis, said frame member being inherently flexible to form a simulated hinge at the joinder between said first and second legs for relative angular displacement between said legs upon displacement of the relative angular relationship between said panels as a result of external stresses; and fastening means intercoupled with said panels in said legs for connecting said legs to the panel which they overlie.

3. In a joint construction: two laminated panels having unfinished edge surfaces, and connecting means consisting of: a frame member having a first leg connected to one of said panels, a second leg formed integral with said first leg and disposed at right angles thereto, said second leg being connected to the other of the panels joined thereby in overlying relationship with the edge surface of said one panel; and a flange formed integrally with one of said legs and projecting oppositely to said first leg and having a length equal to the width of said panel edge surfaces, said flange overlying the edge surface of said other panel, said frame member being inherently flexible to form a simulated hinge at the joinder between said first and second legs for relative angular displacement between said legs upon displacement of the relative angular relationship between said panels as a result of external stresses.

4. In a joint construction: two laminated panels having unfinished edge surfaces, and connecting means consisting of: a frame member having right angular legs adapted to receive fastening means, a first of said legs abutting the outwardly directed face of one of said joined panels and the second of said legs abutting the inwardly directed face of the other of said joined panels and sealingly overlying the unfinished edge surface of said one panel, and a flange projecting oppositely to said first leg and having a length equal to the width of the unfinished edge surfaces of said panels, said flange sealingly overlying the edge of said other panel, and said legs and flange all being joined together in said frame member along a common axis, said frame member being inherently flexible to form a simulated hinge at the joinder between said first and second legs for relative angular displacement between said legs upon displacement of the relative angular relationship between said panels as a result of external stresses; and fastening means securing said legs to the panels abutted thereby.

References Cited in the file of this patent

UNITED STATES PATENTS

| 304,113 | Locher | Aug. 26, 1884 |
| 538,595 | Palica | Apr. 30, 1895 |
| 791,405 | Crandal | May 30, 1905 |
| 1,907,375 | Walker | May 2, 1933 |
| 2,526,113 | Blackwell | Oct. 17, 1950 |
| 2,578,644 | Mautner | Dec. 11, 1951 |

FOREIGN PATENTS

| 189,690 | Great Britain | Dec. 7, 1922 |
| 135,509 | Austraila | Nov. 29, 1949 |